United States Patent
Martin et al.

(10) Patent No.: US 10,304,263 B2
(45) Date of Patent: May 28, 2019

(54) VEHICLE SYSTEM PROGNOSIS DEVICE AND METHOD

(71) Applicant: The Boeing Company, Chicago, IL (US)

(72) Inventors: Charles E. Martin, Westlake Village, CA (US); Tsai-Ching Lu, Thousand Oaks, CA (US); Alice A. Murphy, Mesa, AZ (US); Christopher R. Wezdenko, Mesa, AZ (US); Steve Slaughter, Scottsdale, AZ (US)

(73) Assignee: The Boeing Company, Chicago, IL (US)

( * ) Notice: Subject to any disclaimer, the term of this patent is extended or adjusted under 35 U.S.C. 154(b) by 206 days.

(21) Appl. No.: 15/377,532

(22) Filed: Dec. 13, 2016

(65) Prior Publication Data

US 2018/0165894 A1    Jun. 14, 2018

(51) Int. Cl.
- *G07C 5/08* (2006.01)
- *G06K 9/62* (2006.01)
- *G06K 9/46* (2006.01)

(52) U.S. Cl.
CPC ......... *G07C 5/0808* (2013.01); *G06K 9/4628* (2013.01); *G06K 9/6244* (2013.01); *G07C 5/08* (2013.01); *G07C 5/085* (2013.01)

(58) Field of Classification Search
CPC .... G07C 9/00571; G07C 5/08; G07C 5/0808; G07C 13/00; G07C 5/085

(Continued)

(56) References Cited

U.S. PATENT DOCUMENTS

| 8,682,824 B2 * | 3/2014 | Shibuya | G06N 99/005 706/45 |
| 8,887,286 B2 * | 11/2014 | Dupont | G06F 21/00 726/25 |

(Continued)

OTHER PUBLICATIONS

Chinnam, et al. "Autonomous diagonostics and prognostics in machining processes through competitive learning-driven HMM-based clustering" Taylor & Francis Group; International Journal of Production Research, vol. 47, No. 23 2009. DOI: 10.1080/00207540802232930.

(Continued)

*Primary Examiner* — Courtney D Heinle
*Assistant Examiner* — Luis A Martinez Borrero
(74) *Attorney, Agent, or Firm* — Perman & Green, LLP

(57) ABSTRACT

A method for determining a vehicle system prognosis includes detecting a predetermined characteristic of a vehicle with one or more sensors, obtaining a plurality of sensor signals corresponding to the predetermined characteristic, receiving the plurality of sensor signals from the one or more sensors and determining an input time series of data based on the sensor signals, generating, a matrix of time series data based on the input time series of data, clustering the matrix of time series data based on predetermined clustering criteria into a predetermined number of clusters, generating a sparse temporal matrix based on the predetermined number of clusters, extracting extracted features that are indicative of an operation of a vehicle system from the sparse temporal matrix and determining an operational status of the vehicle system based on the extracted features, and communicating the operational status of the vehicle system to an operator or crew member of the vehicle.

20 Claims, 9 Drawing Sheets

(58) Field of Classification Search
USPC .............................. 701/29.9, 32.1, 31.9, 30.2
See application file for complete search history.

(56) References Cited

U.S. PATENT DOCUMENTS

| | | | | |
|---|---|---|---|---|
| 8,930,120 | B2* | 1/2015 | Kwon | G01H 17/00 |
| | | | | 340/945 |
| 9,349,226 | B2* | 5/2016 | Sundareswara | G01M 17/00 |
| 9,378,112 | B2* | 6/2016 | Banerjee | G06F 11/3495 |
| 9,471,457 | B2* | 10/2016 | Banerjee | G06F 11/3495 |
| 9,558,601 | B2* | 1/2017 | Lu | B64D 45/00 |
| 9,697,245 | B1* | 7/2017 | Butler | G06F 17/30705 |
| 9,916,702 | B2* | 3/2018 | Rudenko | G07C 5/0808 |
| 9,984,334 | B2* | 5/2018 | Nikovski | G06N 99/005 |
| 2007/0272013 | A1* | 11/2007 | Vian | G05B 23/024 |
| | | | | 73/460 |
| 2009/0082919 | A1* | 3/2009 | Hershey | F02D 41/249 |
| | | | | 701/33.4 |
| 2012/0137367 | A1* | 5/2012 | Dupont | G06F 21/00 |
| | | | | 726/25 |
| 2012/0290879 | A1* | 11/2012 | Shibuya | G05B 23/021 |
| | | | | 714/26 |
| 2012/0310939 | A1* | 12/2012 | Lee | G06Q 10/04 |
| | | | | 707/739 |
| 2013/0346594 | A1* | 12/2013 | Banerjee | G06F 11/3409 |
| | | | | 709/224 |
| 2016/0124830 | A1* | 5/2016 | Banerjee | G06F 11/3409 |
| | | | | 714/37 |
| 2016/0224473 | A1* | 8/2016 | Acar | G06F 12/0895 |
| 2018/0211182 | A1* | 7/2018 | Lei | G06N 99/005 |
| 2018/0231969 | A1* | 8/2018 | Noda | G05B 23/02 |
| 2018/0232661 | A1* | 8/2018 | Li | G06N 99/005 |
| 2018/0232700 | A1* | 8/2018 | Li | G06Q 10/1053 |
| 2018/0239345 | A1* | 8/2018 | Noda | G05B 23/02 |

OTHER PUBLICATIONS

Doan, et al. "Derivation of effective and efficient data set with subtractive clustering method and genetic algorithm" IWA Publishing, Journal of Hydroinformatics, vol. 07, Issue 4, pp. 219-233, 2005.

Elhamifar, et al. "Sparse Subspace Clustering: Algorithm, Theory, and Applications" IEEE Transations on Pattern Analysis and Machine Intelligence, vol. 35, Issue 11, pp. 2765-2781, 2013. DOI: 10.1109/TPAMI.2013.57.

Javed, et al. "Novel failure prognostics approach with dynamic thresholds for machine degradation" IEEE Conference Publications; IECON 2013—39th Annual Conference of the IEEE Industrial Electronics Society, pp. 4404-4409, 2013. DOI: 101109/IECON.2013.6699844.

Javed, et al. "A New Multivariate Approach for Prognosticcs Based on Extreme Learning Machine and Fuzzy Clustering" IEEE Journals & Magazines; IEEE Transactions on Cybernetics, vol. 45, Issue 12, pp. 2626-2639, 2015. DOI: 1031109/TCYB.2014.2378056.

Richter, et al. "Temporal and spatial clustering for a parking prediction service" IEEE Conference Publications: IEEE 26th International Conference on Tools with Artificial Intelligence, pp. 278-282, 2014. DOI: 10/1109/ICTAI.2014.49.

* cited by examiner

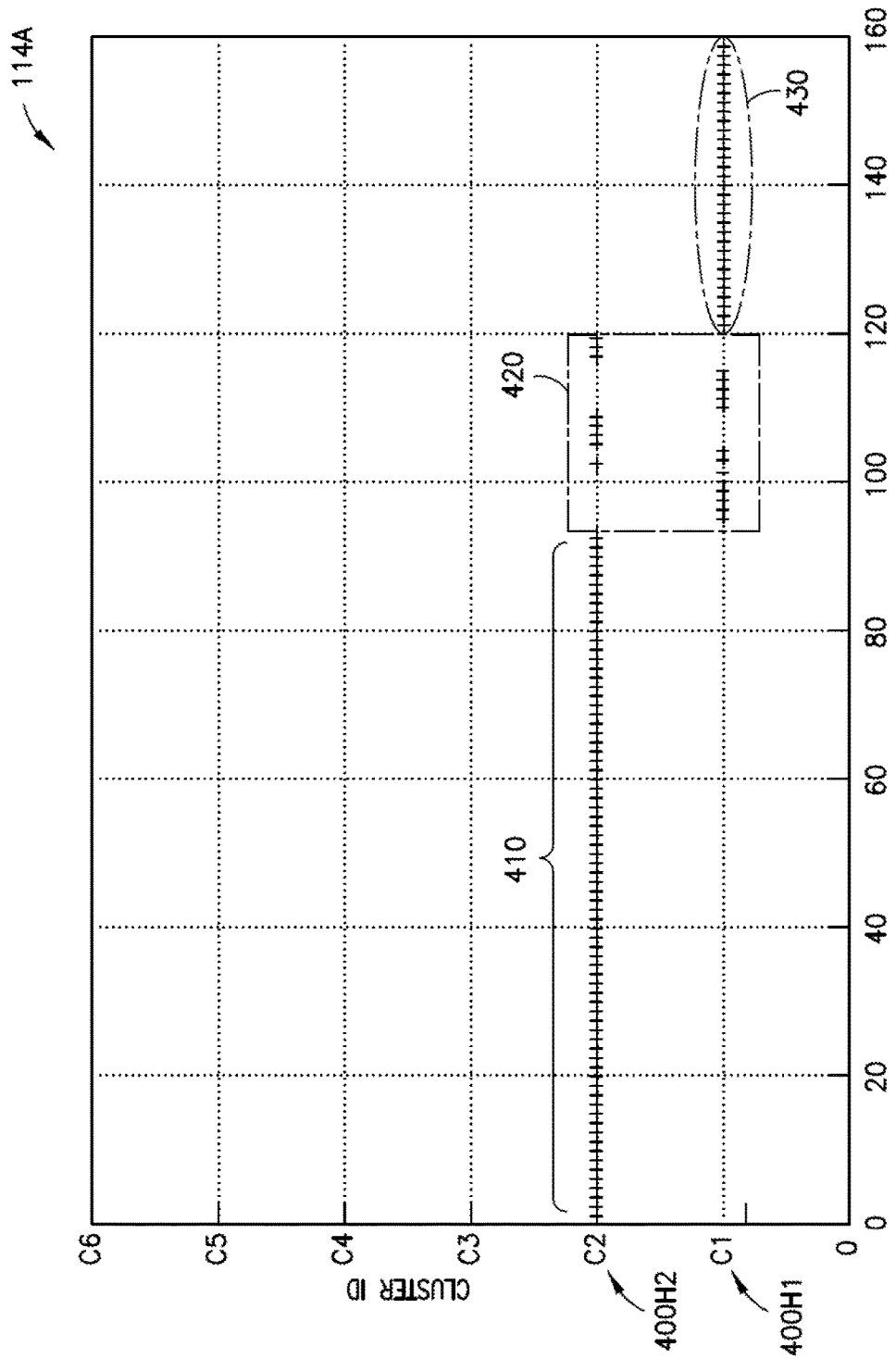

VEHICLE SYSTEM PROGNOSIS DEVICE AND METHOD

This invention was made with Government support under Contract No. W911W6-13-02-0007 awarded by Department of Defense. The government has certain rights in this invention.

BACKGROUND

Conventionally the use of clustering for unsupervised learning of features in time series focuses on grouping data points into a fixed number of clusters. In the field of prognostics and health management it is generally assumed that grouping corresponds to a degree of component wear/degradation with respect to a particular type of fault mode.

Conventionally, clustering time series data for modeling and prediction with respect to prognostics, diagnostics or remaining useful life prediction is performed several different ways. For example, subtractive-maximum entropy fuzzy clustering may be used as a form of unsupervised feature learning. The subtractive-maximum entropy fuzzy clustering operates on multidimensional time series data and associated each cluster with a component condition. With subtractive-maximum entropy fuzzy clustering, the number of clusters is predetermined using subtractive clustering and, therefore, any available information from cluster stability is lost.

As another example, competitive model based clustering utilizes hidden Markov models to represent time series with different characteristics. As a condition of a component degrades the time series of measurements generated by the component as different features. The hidden Markov models compete to represent segments of the time series and, ultimately, partition the time series into groups of segments generated by different operating conditions. Supervised learning is then used to map each set of segments to a degree of component degradation. A disadvantage of competitive model based clustering is that it focuses on one dimensional time series data due to the challenge of modeling multi-dimensional time series data accurately with hidden Markov models.

A further example of clustering time series focuses on clustering different segments of one dimensional time series such as with dynamic time warping as the metric between time series segments. A standard clustering algorithm is then applied to the set of segments. A unique predictive model is then learned for each cluster of data.

SUMMARY

Accordingly, a system and method, intended to address one or more of the above-identified (or other) concerns, would find utility.

One example of the present disclosure relates to a method for determining a vehicle system prognosis, the method comprising: detecting a predetermined characteristic of a vehicle with one or more sensors onboard the vehicle; obtaining a plurality of sensor signals corresponding to the predetermined characteristic from the one or more sensors; receiving, with a processor onboard the vehicle, the plurality of sensor signals from the one or more sensors onboard the vehicle and determining, with the processor onboard the vehicle, an input time series of data based on the sensor signals; generating, with the processor onboard the vehicle, a matrix of time series data based on the input time series of data; clustering, with the processor onboard the vehicle, the matrix of time series data based on predetermined clustering criteria into a predetermined number of clusters; generating a sparse temporal matrix, with the processor onboard the vehicle, based on the predetermined number of clusters; extracting, with the processor onboard the vehicle, features that are indicative of an operation of a vehicle system from the sparse temporal matrix and determining an operational status of the vehicle system based on the features; and communicating, with the processor onboard the vehicle, the operational status of the vehicle system to an operator or crew member of the vehicle.

One example of the present disclosure relates to a vehicle system prognosis device comprising: one or more sensors onboard a vehicle, the one or more sensors being configured to detect a predetermined characteristic of the vehicle system and generate a plurality of sensor signals corresponding to the predetermined characteristic; an indicator device; and a processor onboard the vehicle, the processor being connected to the one or more sensors and the indicator device and being configured to receive the plurality of sensor signals from the one or more sensors onboard the vehicle and determine an input time series of data based on the sensor signals; generate a matrix of time series data based on the input time series of data; cluster the matrix of time series data based on predetermined clustering criteria into a predetermined number of clusters; generate a sparse temporal matrix based on the predetermined number of clusters; extract extracted features that are indicative of an operation of a vehicle system from the sparse temporal matrix and determine an operational status of the vehicle system based on the extracted features; and communicate the operational status of the vehicle system to an operator or crew member of the vehicle through the indicator device.

One example of the present disclosure relates to a method for determining a vehicle system prognosis, the method comprising: detecting a predetermined characteristic of a vehicle with one or more sensors onboard a vehicle; obtaining a plurality of sensor signals corresponding to the predetermined characteristic from the one or more sensors; receiving, with a processor onboard the vehicle, the plurality of sensor signals from the one or more sensors onboard the vehicle and determining, with the processor onboard the vehicle, an input time series of data based on the sensor signals; generating, with the processor onboard the vehicle, a matrix of time series data in a data distribution space based on the input time series of data; clustering, with the processor onboard the vehicle, the matrix of time series data based on predetermined clustering criteria into a predetermined number of data regions of the data distribution space; generating a sparse temporal matrix, with the processor onboard the vehicle, based on data within the predetermined number of data regions; extracting, with the processor onboard the vehicle, features that are indicative of an operation of a vehicle system from the sparse temporal matrix and determining an operational status of the vehicle system based on the features; and communicating, with the processor onboard the vehicle, the operational status of the vehicle system to an operator or crew member of the vehicle.

BRIEF DESCRIPTION OF THE DRAWINGS

Figure 1:
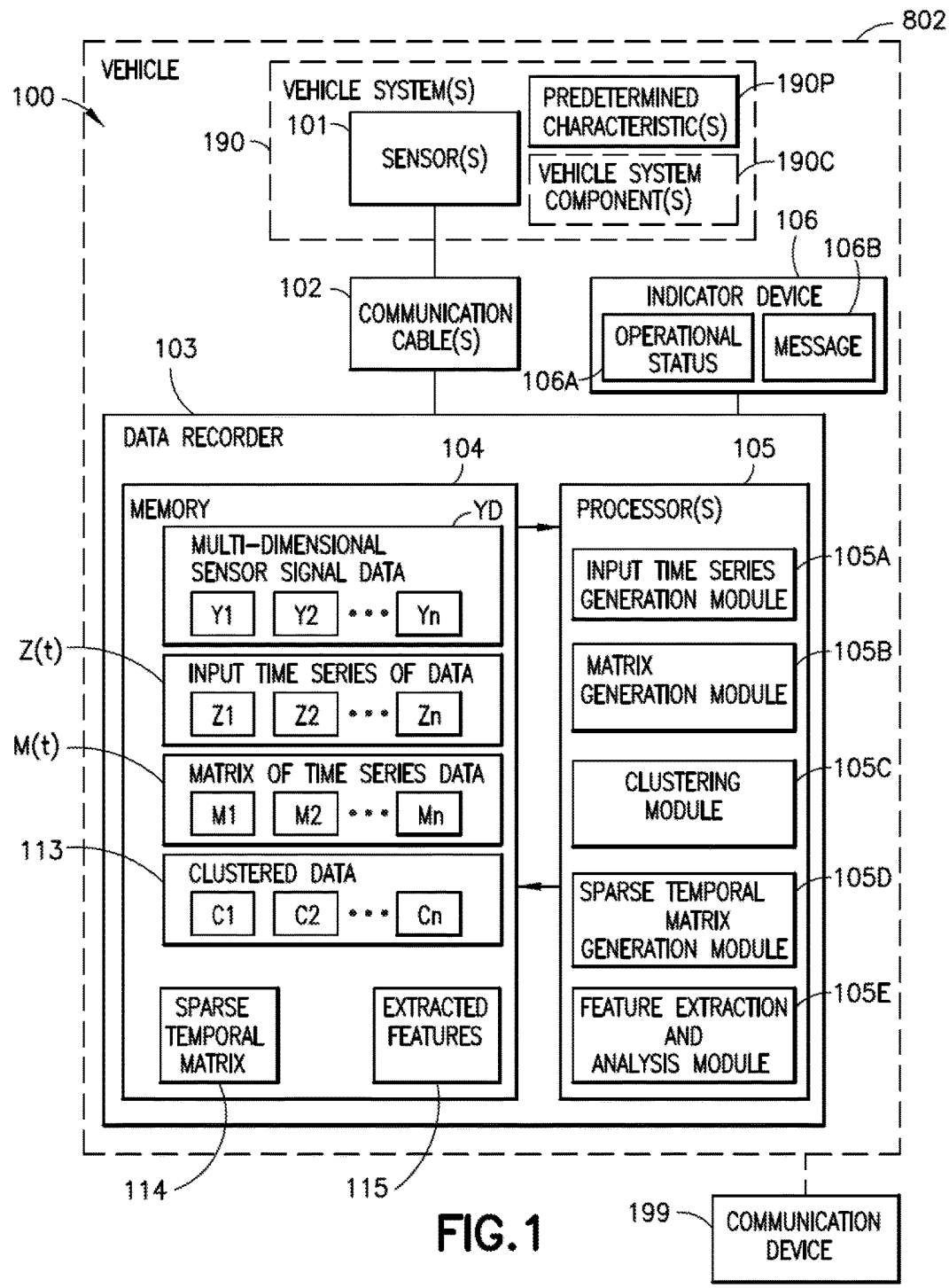
Figure 2:
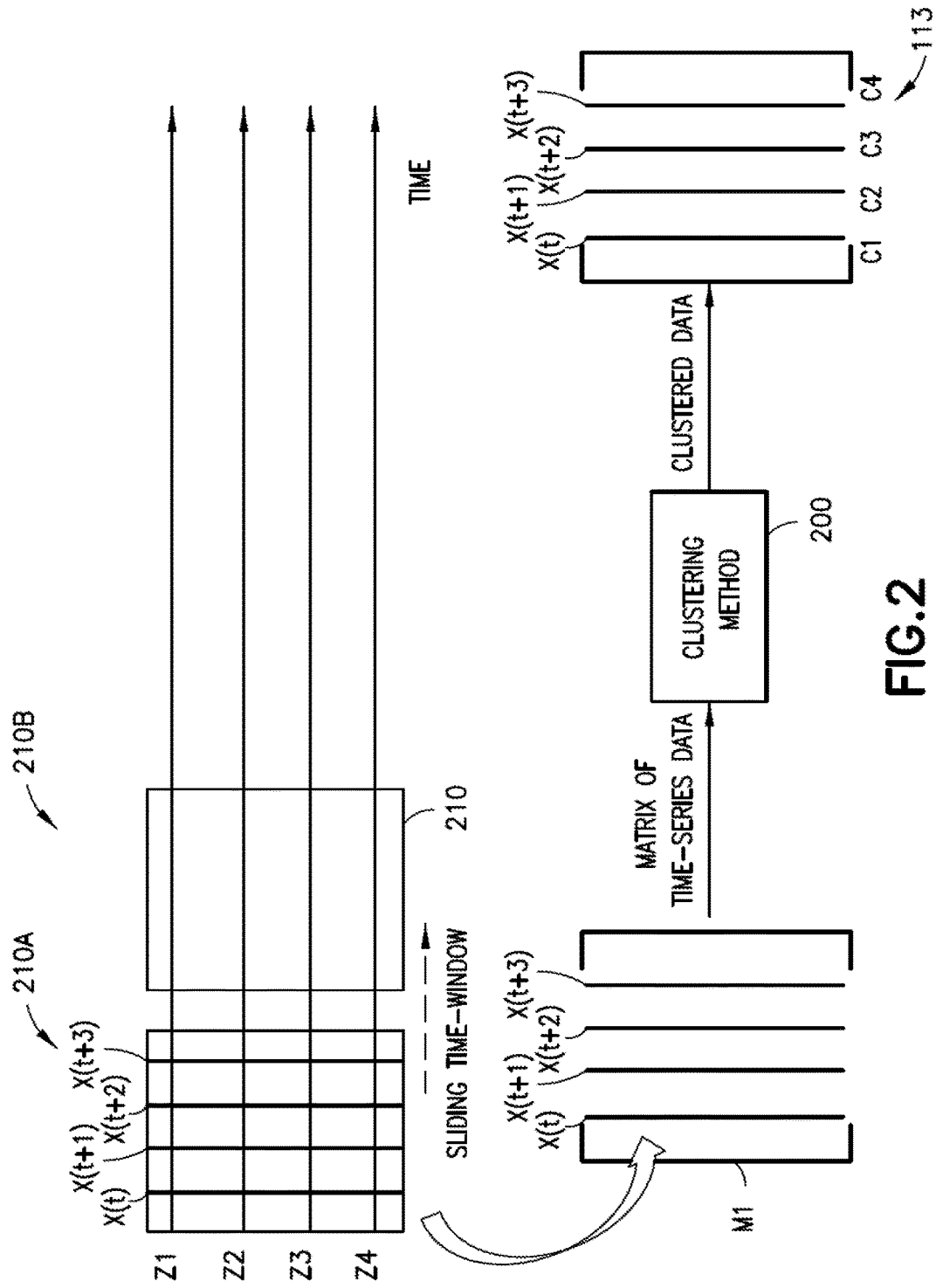
Figure 3A:
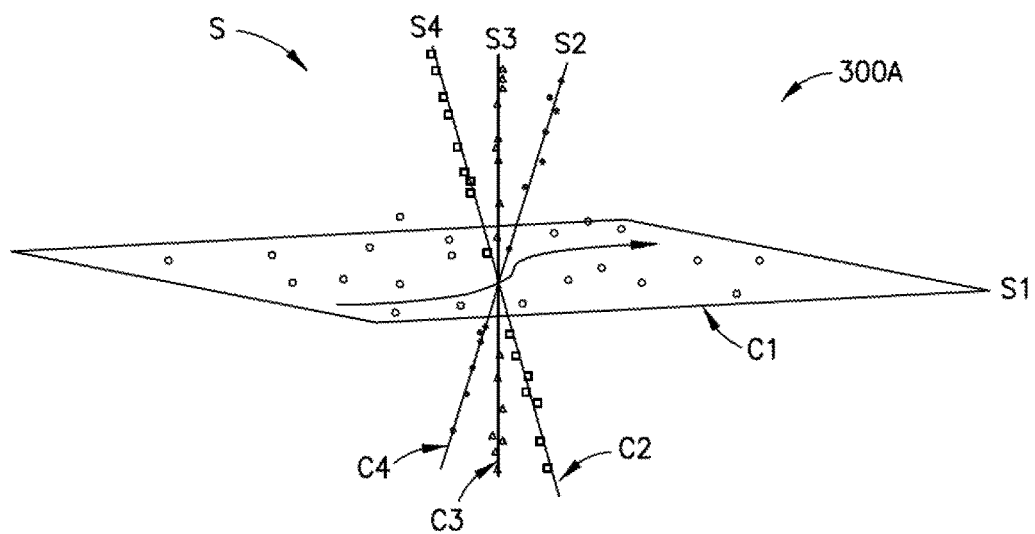
Figure 3B:
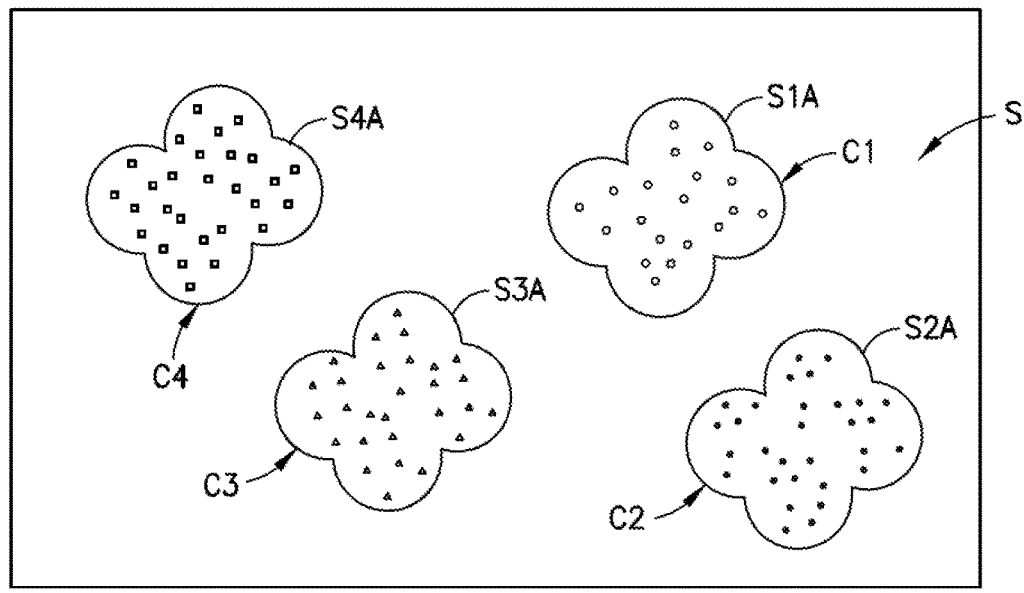
Figure 3C:
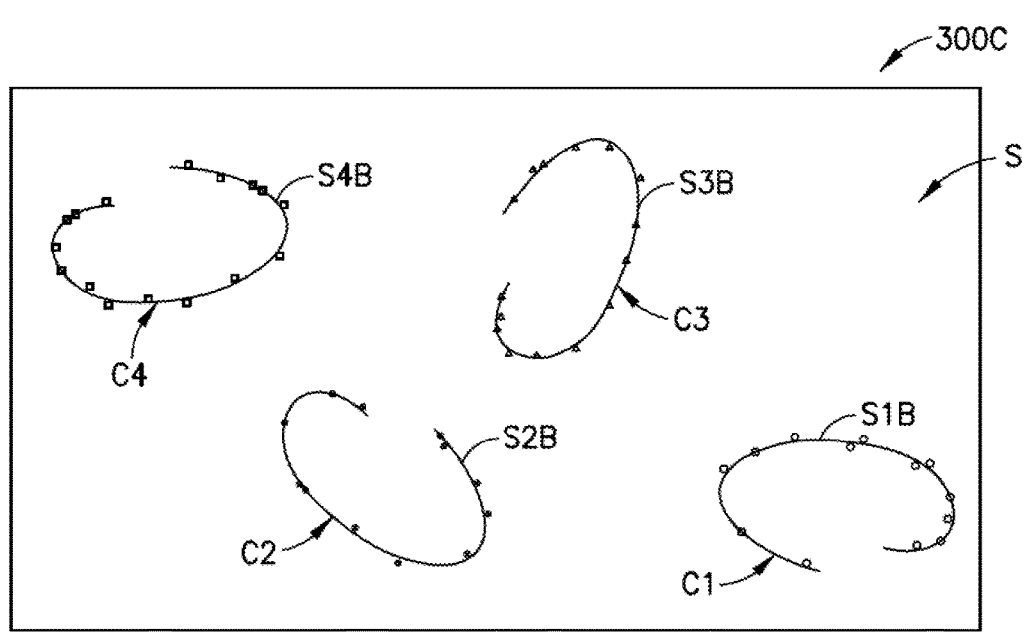
Figure 5:
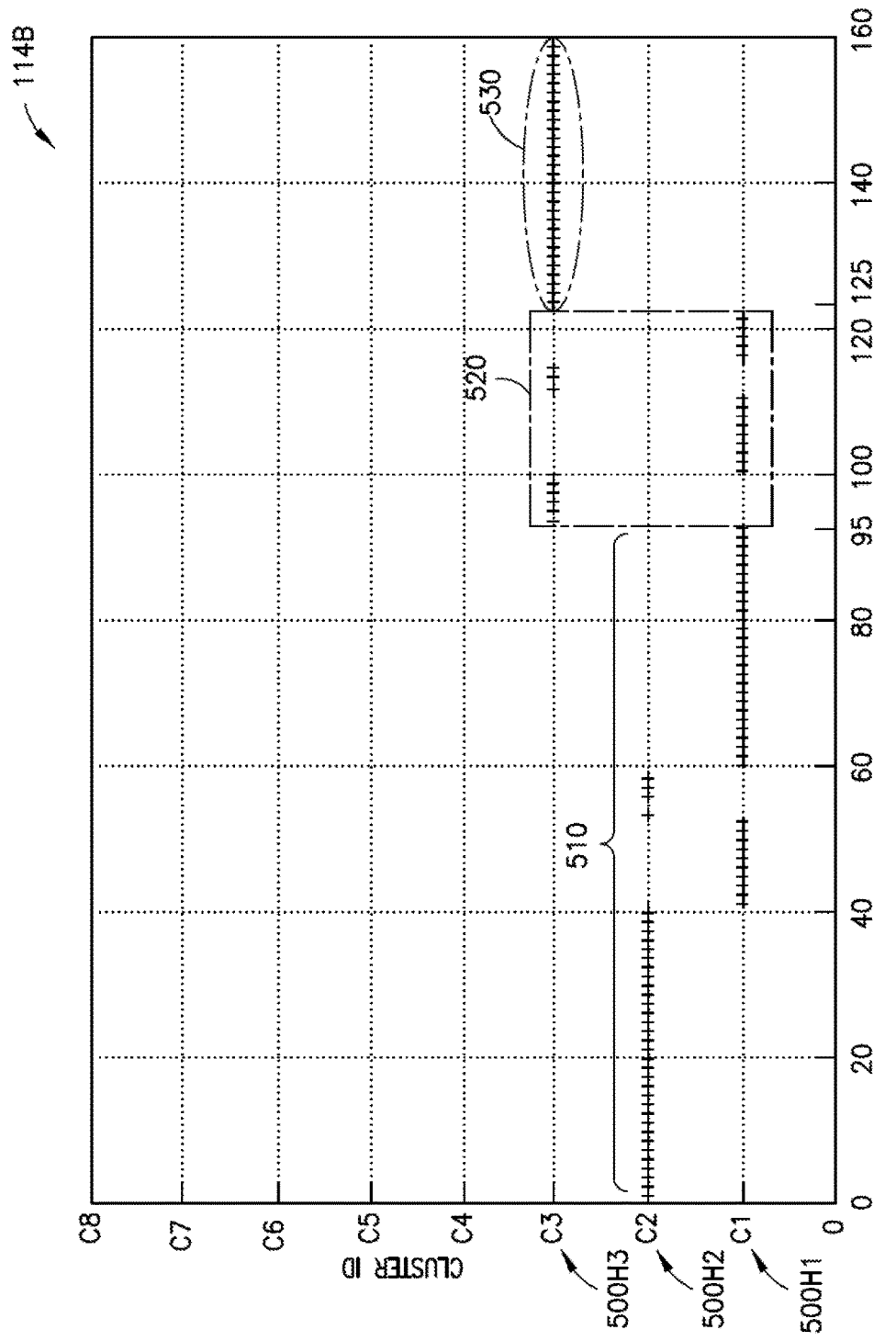
Figure 6:
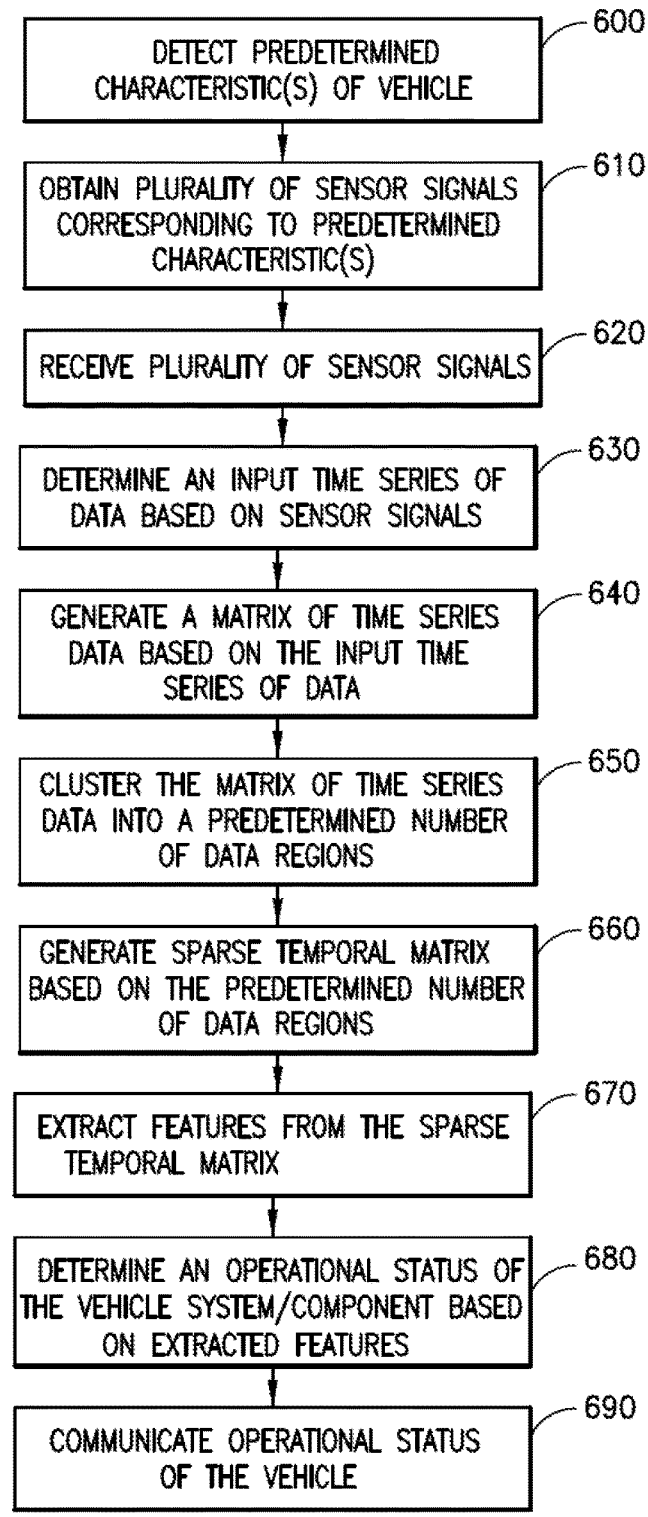
Figure 7:
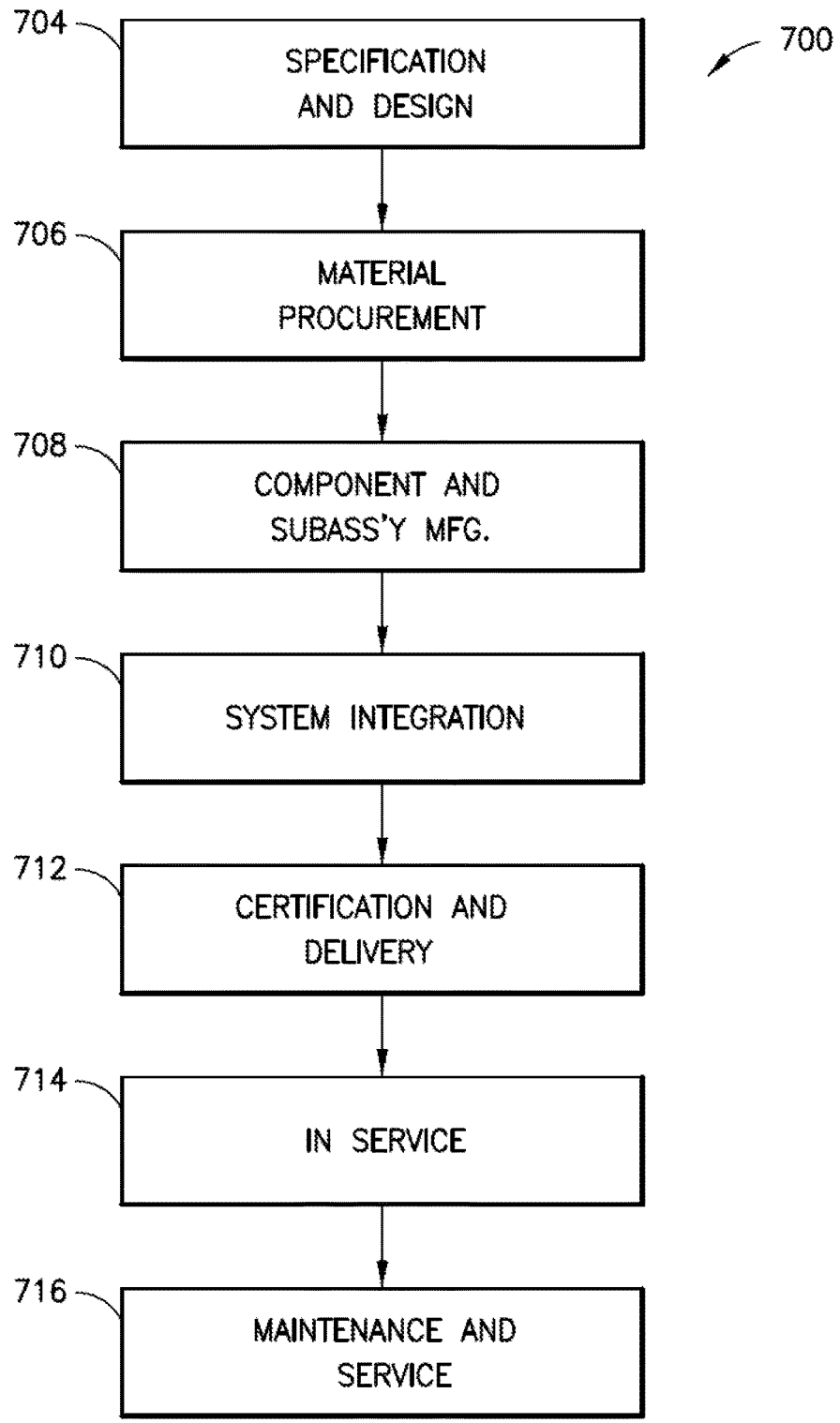

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of a vehicle system prognosis device, according to one aspect of the present disclosure;

FIG. 2 is a schematic illustration of a time series of sensor signals, data windowing and clustering, according to one aspect of the disclosure;

FIG. 3A is a schematic illustration of data point vectors in respective subspaces, according to one aspect of the disclosure;

FIG. 3B is a schematic illustration of data points in respective localized regions, according to one aspect of the disclosure;

FIG. 3C is a schematic illustration of data point vectors in respective non-linear manifolds, according to one aspect of the disclosure;

FIG. 4 is a sparse temporal matrix illustrating a time series of data points, according to one aspect of the disclosure;

FIG. 5 is a sparse temporal matrix illustrating a time series of data points, according to one aspect of the disclosure;

FIG. 6 is a flow diagram for a method for determining vehicle system prognosis, according to an aspect of the disclosure:

FIG. 7 is a flow diagram of aircraft production and service methodology; and

Figure 8:
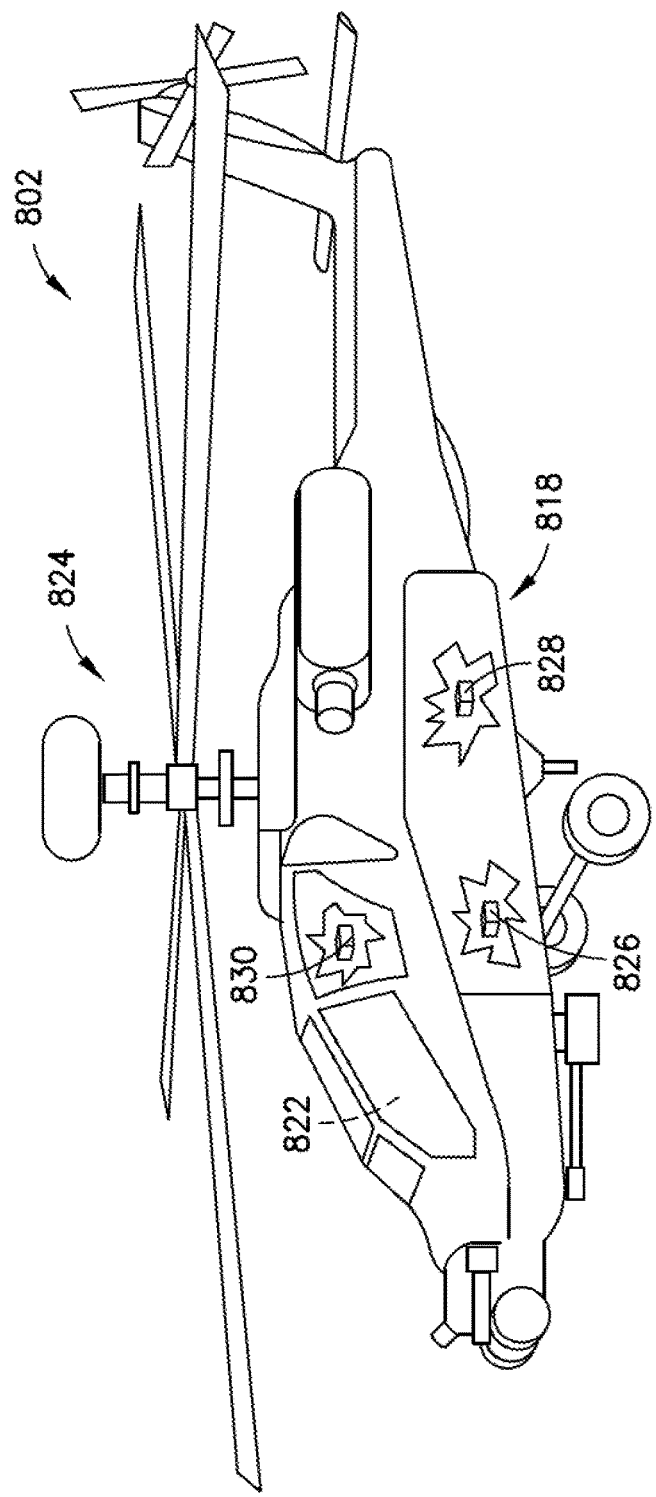

FIG. 8 is a schematic illustration of an aircraft including distributed vehicle systems.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Referring to FIGS. 1 and 8, the aspects of the present disclosure described herein provide a vehicle system prognosis device 100 and method that use cluster-based feature extraction for enhancing vehicle prognostics and remaining useful life prediction. The aspects of the present disclosure use multiscale temporal clustering and automatically organize multidimensional time series data, such as input time series of data Z(t), into meaningful groups. Aspects of the present disclosure utilize one or more of inter-cluster dynamics and cluster stability as a feature for vehicle system component 190C fault prediction and condition estimation. The inter-cluster dynamics and cluster stability carry information, such as data points that represent information about the operating condition of the vehicle system components 190C and that provide for distinguishing between different fault modes, such as wiring and sensor faults versus mechanical faults, as well as a degree of component degradation. In one aspect, the degree of component degradation provides for the determination of a remaining useful life of the vehicle system components 190C.

As described in greater detail herein, given a set of variables, such as the multi-dimensional sensor signal data YD, through which the states (e.g., condition) of one or more vehicle system components 190C are measured, and a multi-dimensional time series of data points, such as the input time series of data Z(t), extracted features 115 are extracted by time windowing the input time series of data Z(t) to generate one or more matrix of time series data M(t). The data points of the one or more matrix of time series data M(t) are clustered a predetermined number of times to generate clustered data 113 that includes multiple clusterings C1-Cn. The multiple clusterings C1-Cn are mapped to a sparse temporal matrix 114. The extracted features 115 are extracted from the sparse temporal matrix 114 where the extracted features 115 and/or clusterings C1-Cn, as represented in the sparse temporal matrix, are output to a vehicle operator or any other suitable individual, such as maintenance personnel. The extracted features 115 and/or clusterings C1-Cn, as represented in the sparse temporal matrix, are used to detect shifts in the operating conditions of the vehicle system components 190C and to predict faults and remaining useful life of the vehicle system components 190C.

As also described in greater detail below, the aspects of the present disclosure generate and utilize multiple clusterings C1-Cn of a common data set at different levels of granularity. The different levels of granularity provide a multi-scale view of the common data set and provides information about a stability of the learned clusters over temporal and spatial dimensions, which effectively provide an early indication of impending fault of a vehicle system component 190C. The presentation of the multiple clusterings C1-Cn and a temporal component of the data as a sparse temporal matrix provides a framework for analyzing inter-cluster dynamics. The inter-cluster dynamics captures features such as fracturing (e.g., when data points jump from one cluster to another cluster) and cluster transition (e.g., when data points permanently transition from one cluster to another) which are indicative of different types of vehicle system component 190C fault modes. Given sufficient historical data, fracturing and cluster transition can be used to predict the remaining useful life of the vehicle system component 190C being monitored.

Aspects of the present disclosure provide for the extraction of the extracted features 115 from large groups of noisy multidimensional sensor signal data for the purpose of enhancing the prediction of impending vehicle system component 190C faults and remaining useful life. Generally, the vehicle 802 includes an array of different subsystems, such as referring to FIG. 8, e.g., a propulsion system 824, an electrical power system 826, a hydraulic system 828, and an environmental system 830. Each of the subsystems includes respective vehicle system components 190C and the sensors 101 measure various aspects of the states of the vehicle system components 190C. The measurements, e.g. multidimensional sensor signal data YD, obtained from the sensors is used by the vehicle system prognosis device 100 to infer the states and operating characteristics of the vehicle subsystems and their respective vehicle system components 190C. Underlying causal mechanisms exist within and between the vehicle subsystems, which induce statistical dependencies among the measured multidimensional sensor signal data YD. The aspects of the present disclosure extract these statistical dependencies and organize them into features that reveal subtle signals that indicate shifts or changes in the operating characteristics of the vehicle system components 190C. In one aspect, the subtle signals include subtle intermittent inconsistencies in the dynamics of recorded sensor 101 measurements. These shifts or changes in the subtle signals, which are described below, indicate impending vehicle system component 190C faults as well as indicate information regarding remaining useful life of the vehicle system component 190C.

The multi-scale clustering and the incorporation of the temporal ordering of the data points (e.g., in the input time series of data Z(t) and the matrix of time series data M(t)), provides for the vehicle system prognosis device 100 to predict impending faults through the subtle signals. Further, the multi-scale clustering of the present disclosure enables the use of simple classifiers (such as fracturing and cluster transition) directly on top of the extracted features at the backend of the vehicle system prognosis device 100, such as during feature extraction and analysis.

Still referring to FIGS. 1 and 8, the vehicle system prognosis device 100 may be integrated into any suitable vehicle 802. The vehicle system prognosis device 100 includes one or more sensors 101 onboard the vehicle 802, the one or more sensors 101 being configured to detect a predetermined characteristic 190P of the vehicle system 190 (and/or a vehicle system component 190C) and generate multidimensional sensor signal data YD that includes a plurality of sensor signals Y1-Yn corresponding to the predetermined characteristic 190P. The sensor signals Y1-Yn may come from continuous or discrete events within the vehicle system 190. The predetermined characteristics 190P may be any suitable characteristics such as current draw, vibrations, fluid flow rates, etc. that correspond with the operation of the vehicle system component 190C being monitored. The one or more sensors 101 are connected to any suitable data recorder 103 located onboard the vehicle 802 through, for example, communication cables 102 and/or any suitable wireless communications. The data recorder 103 may be any suitable data recorder such as a maintenance data recorder, a modernized signal processing unit or a flight data recorder. In one aspect, the data recorder 103 includes any suitable memory 104 and one or more processors 105 configured to perform the aspects of the present disclosure described herein. Any suitable indicator device 106, such as any suitable visual display and/or aural indicator is connected to the data recorder 103 to receive, from e.g. the processor 105 of the data recorder, and indicate an operational status 106A (which may include e.g. a remaining useful life of at least a component of the vehicle system) or other message 106B to the vehicle 802 operator or other personnel. In one aspect, the other message 106B includes at least one or more of a message to repair a component of the vehicle system 190, a message to replace a component of the vehicle system 190, a message to obtain a replacement component of the vehicle system 190 and stage the replacement component at a predetermined area, and a message to change a deployment schedule of the vehicle 802 so that the vehicle system 190 is repaired based on a remaining useful life prediction of a vehicle system component 190C.

Referring to FIGS. 1, 2 and 3A-3C, in one aspect, the processor 105, which by virtue of the data recorder 103 is connected to the one or more sensors 101 and the indicator device 106, is configured to receive the sensor signals Y1-Yn (that form the multidimensional sensor signal data YD) from the one or more sensors 101 and, using an input time series generation module 105A, determine the input time series of data Z(t) based on the sensor signals Y1-Yn. The processor 105 is further configured to generate a matrix of time series data M(t), with a matrix generation module 105B, based on the input time series of data Z(t). The matrix of time series data M(t) is generated by, for example, time windowing the input time series of data Z(t) with a window 210 having any suitable size (e.g. so as to include any suitable number of point in time). For example, a time window 210 having a fixed length (in this example the length is four time units (t)-(t+3)) is moved across the input time series of data Z(t) and each window of data creates a grouping of data points in the matrix of time series data M(t). In one aspect, the length of the time window 210 may be preset or the length may be set by an operator of the vehicle 802 or other personnel (i.e. user defined), noting that the time window 210 should be large enough to capture correlated points in time but not so large that the time window captures uncorrelated points in time. In one aspect, as the time window 210 is moved along the input time series of data Z(t) the positions 210A, 210B of the window 210 may or may not overlap one another. It is noted that a matrix M1-Mn of the matrix of time series data M(t) is generated for each position 210A, 210B of the window 210 along the input time series of data Z(t) as illustrated in FIG. 2. For example, time window 210 at position 210A is used to generate matrix M1 while window 210 at position 210B would be used to generate matrix M2 and so on.

In one aspect, the processor 105 is configured to generate the matrix of time series data M(t) so that the matrix of time series data M(t) exists in a data distribution space 300A, 300B, 300C having a dimension corresponding to a number of input time series of data X1(t)-Xn(t) and a size of a time window 210 used to determine the matrix of time series data M(t). In the example, illustrated in FIG. 2 the data distribution space 300 has a dimension of four by four (e.g. four input time series of data Z1-Z4 and a time window 210 spanning four time units (t)-(t+3)). In one aspect, depending on a type of clustering used by the vehicle system prognosis device 100, each time series $X(t)$, $X(t+1)$, $X(t+2)$, $X(t+3)$, etc. in the matrix of time series data M(t) exists in a respective subspace S1-S4 within the data distribution space 300A, in a respective non-linear manifold S1B-S4B within the data distribution space 300C, in a respective localized region or "blob" S1A-S4A within the data distribution space 300B or in any other suitable space, which are collectively referred to herein as data regions S.

The processor 105 is configured to cluster the matrix of time series data M(t), with a clustering module 105C, based on any suitable predetermined clustering criteria into a predetermined number of clusters C1-Cn where the predetermined number of clusters C1-Cn includes more than two temporally contiguous clusters C1-Cn. In one aspect, clustering of the matrix of time series data M(t) is performed using any suitable clustering method 200 such as, for example, sparse subspace clustering, agglomerative clustering or affinity propagation. As an example, where the matrix of time series data M(t) is clustered into the subspaces S1A-S4A of data distribution space 300A, each of the subspaces S1A-S4A represents a cluster C1-C4 and each cluster C4-C4 comprises a hyperplane 400H1, 400H2, 500H1, 500H2, 500H3 (see FIGS. 4 and 5) of the data distribution space 300A. Similarly, where the matrix of time series data M(t) is clustered into the non-linear manifolds S1B-S4B of data distribution space 300C, each of the non-linear manifolds S1B-S4B represents a cluster C1-C4; and where the matrix of time series data M(t) is clustered into the localized regions S1A-S4A of data distribution space 300B, each of the localized regions S1A-S4A represents a cluster C1-C4.

In accordance with aspects of the present disclosure the clustering method 200 used by the clustering module 105C provides for a specified number of clusters C1-Cn to be generated or has a parameter that increases or decreases the number of generated clusters C1-Cn. For example, the clustering method 200 operates on the matrix of time series data M(t) generated by the time windowing of the input time series of data Z(t). In one aspect, an operator of the vehicle 802 or other personnel may specify a number of times to apply the clustering method 200 and how many clusters to split each matrix of time series data M1-Mn into for each application; while in other aspects the number of times to apply the clustering method 200 and how many clusters to split each matrix of time series data M1-Mn into may be preset. As an example, the operator or other personnel may specify a list of clustering criteria that defines the number of clustering application and the number of clusters to be generated for each clustering application. For example, the list of clustering criteria may be [2, 3, 4, 6, 8, 12], which means that the clustering method 200 is to be applied to, for example, each matrix M1-Mn in the matrix of time series data M(t) six times where, for each matrix M1-Mn, the first clustering application splits the matrix data into two clusters C1, C2, the second clustering application splits the matrix data into three clusters C3-C6, the third clustering application splits the matrix data into four clusters C7-C10, the fourth application splits the matrix data into six clusters C11-C16, the fifth clustering application splits the matrix data into eight clusters C17-C24 and the sixth clustering application splits the matrix data into twelve clusters C25-C36 so that different levels of granularity for each matrix M1-Mn are created. Alternatively, if the clustering method 200 has a parameter that specifies how aggressive the clustering method 200 should be in placing the data points of each matrix M1-Mn into different groupings, then the operator of the vehicle 802 or other personnel would specify a list of parameter values corresponding to the aggressiveness of the clustering method 200.

Referring to FIGS. 1, 2, 4 and 5, the processor 105 is configured to organize the predetermined number of clusters C1-Cn of data points and generate a sparse temporal matrix 114 based on the predetermined number of clusters C1-Cn, with a sparse temporal matrix module 105D. In one aspect, a sparse temporal matrix 114 is generated for each clustered data 113 where each clustered data corresponds to a respective one of the matrices M1-Mn of the matrix of time series data M(t). In one aspect, as can be seen in FIGS. 4 and 5, the columns of the sparse temporal matrix 114, 114A, 114B represent the ordered discrete time points at which the sensor signals Y1-Yn were taken/obtained. The rows of the sparse temporal matrix 114, 114A, 114B represent the clusters C1-Cu. In one aspect, the clusters C1-Cn that belong to the clusterings that generated the fewest number of clusters occupy the first rows and so on. For example, using the list of clustering criteria (e.g., [2, 3, 4, 6, 8, 12]) described above, the two clusters generated during the first application of the clustering would occupy rows 1 and 2, the three clusters generated during the second application of the clustering would occupy rows 3-5 and so on. An entry in the sparse temporal matrix 114, 114A, 14B corresponding to the column for time T and row (i, j—where i indicates the clustering application and j indicates the cluster generated during the $i^{th}$ clustering application) has a one if the data point measured at time T belongs to the $j^{th}$ cluster generated by the $i^{th}$ clustering, and a zero otherwise (noting that for every time/column there is exactly one non-zero entry for each clustering).

The processor 105 is configured to extract, with a feature extraction and analysis module 105E, extracted features 115 that are indicative of an operation of the vehicle system 190 from the sparse temporal matrix 114 and determine an operational status of the vehicle system 190 based on the extracted features 115. In one aspect, there may be two broad classes of features that are indicative of an operation of the vehicle system 190. For example, these two broad classes of features may be stable inter-cluster dynamics and unstable inter-cluster dynamics. The exhibition of stable inter-cluster dynamics between the clusters C1-Cn of the sparse temporal matrix 114, 114A, 114B may indicate normal operation of the vehicle system 190 or vehicle system component 190C being monitored. For example, referring to FIG. 4, region 410 is an area of stable inter-cluster dynamics where the data points in the sparse temporal matrix 114A exist in a common cluster C2. As another example, referring to FIG. 5, region 510 is an area of stable inter-cluster dynamics where the data points in the sparse temporal matrix 114B exist in two clusters C1, C2 where the change of data points from cluster C2 to cluster C1 may be a result of a modification to the vehicle system 190 or vehicle system component 190C being monitored. Regions 430 and 530 in FIGS. 4 and 5 are also illustrative of the stable inter-cluster dynamic feature of cluster transition, but as will be described below where a cluster transition occurs after a region of unstable inter-cluster dynamics this cluster transition indicates an impending fault in the vehicle system 190 or vehicle system component 190C.

The exhibition of unstable inter-cluster dynamics is an indication that vehicle system 190 or vehicle system component 190C will experience a fault within, for example, a predetermined amount of time. One example of unstable inter-cluster dynamics is fracturing which is illustrated in regions 420 and 520 in FIGS. 4 and 5. Here the data points of the sparse temporal matrix 114A, 114B jump sporadically or frequently from one cluster to another different cluster and persists as the number of clusters increases in which the sparse temporal matrix data points reside.

The processor 105 is configured to monitor a stability of data points within the predetermined number of clusters C1-Cn in the sparse temporal matrix 114, 14A, 114B where a change in stability of the data points within the predetermined number of clusters C1-Cn is indicative of a transition to a fault in the vehicle system 190 or vehicle system component 190C.

In one aspect a mean distance between clusters C1-Cn that data is transitioning between is monitored and the resulting scalar value is compared to a predefined threshold. For example, as described above, the processor 105 monitors the behavior of data points within the sparse temporal matrix 114, 114A, 114B with respect to an existence of the data points within one or more of the a predetermined number of clusters C1-Cn so that features such as fracturing or cluster transition are identified. Fracturing behavior of the data points (e.g. where the data points serially transition between two or more clusters of the predetermined number of clusters) is indicative of a pre-transition to a fault in the vehicle system 190 or in the vehicle system component 190C. The transition behavior of the data points where the data points permanently transition from one cluster to a different cluster (i.e. cluster transition), when such transition follows fracturing, is indicative of a transition to a fault in the vehicle system 190C or in the vehicle system component 190C.

Where, for example, sparse subspace clustering is used as the clustering method 200, in one aspect, each of the clusters C1-Cn (represented as rows) in the sparse temporal matrix comprises a hyperplane 400H1, 400H2, 500H1, 500H2, 500H3 of the data distribution space 300A. In this aspect, the processor is configured to extract the extracted features 115 that are indicative of the operation of the vehicle system 190 by monitoring behavior of data points within the sparse temporal matrix 114 with respect to an existence of the data points within one or more hyperplanes 400H1, 400H2, 500H1, 500H2, 500H3. In one aspect, the extracted features 115 include the fracturing behavior of the data points where the data points serially transition between two or more hyperplanes 400H1, 400H2, 500H1, 500H2, 500H3, where the fracturing behavior is indicative of a pre-transition to a fault in the vehicle system 190. In one aspect, the extracted features 115 include the transition behavior of the data points where the data points permanently transition from one hyperplane 400H1, 400H2, 500H1, 500H2, 500H3 to a different hyperplane 400H1, 400H2, 500H1, 500H2, 500H3, where the transition behavior is indicative of a transition to a fault in the vehicle system 190.

In addition to the features of cluster stability, fracturing and cluster transition other features indicative of vehicle system faults can be learned automatically by the processor 105 using any suitable machine learning techniques. For example, the processor 105 may be configured with deep convolutional neural networks for extracting predetermined features from large sparse temporal matrices. Such predetermined features includes the behaviors of the hyperplanes 400H1, 400H2, 500H1, 500H2, 500H3 where, for example, a single hyperplane indicates normal operation and multiple hyperplanes indicate transition to or impending fault with the vehicle system 190. In one aspect, the use of hyperplanes 400H1, 400H2, 500H1, 500H2, 500H3 in monitoring fracturing behavior provides for counting the number of unique hyperplanes, monitoring a time the data points spend in each hyperplane, and monitoring the distance between the hyperplanes. The processor 105 may be configured to generate a mathematical model based on one or more of the number of hyperplanes, the time data points spend in each hyperplane and the distance between hyperplanes to predict remaining useful like of the vehicle system 190 or vehicle system component 190C being monitored.

In one aspect, the processor 105 may be configured to store, in memory 104, amounts of time between fracturing and the existence of a predetermined type of fault and/or an amount of time between cluster transition and the existence of the predetermined type of fault for creating historical data that correlates time-to-fault with particular types of faults so that as fracturing or cluster transition occurs the historical data can be used by the processor 105 to determine a remaining useful life of the vehicle system 190 or vehicle system component 190C being monitored.

In one aspect, the processor 105 is configured to communicate the one or more of the features that are indicative of an operation of a vehicle system 190, the operational status 106A of the vehicle system 190 and/or the message 106B to an operator or crew member of the vehicle 802 through the indicator device 106, in other aspects the processor 105 is configured to communicate (either through wired or wireless communication) the one or more of the features that are indicative of an operation of a vehicle system 190, the operational status 106A of the vehicle system 190 and/or the message 106B to a communication device 199 located off-board the vehicle. For example, the output of the vehicle system prognosis device 100 is, in one aspect, the extracted features 115 and the clusters C1-Cn that constitute the extracted features 115. The output of the vehicle system prognosis device 100 may be used for prognosis of the vehicle system 190 and/or vehicle system component 190C in that the extracted features 115 are used to predict and diagnose faults as described above. As an example, a strong fracturing phenomenon may be indicative of sensor wiring problems (noting that the types of faults associated with the vehicle system 190 and/or vehicle system components 190C as they relate to the fracturing and cluster transition phenomenon may be learned over time (e.g. by the processor 105 and/or by an operator of the vehicle 802 or other personnel) to identify the type of fault with increasing certainty). In addition, the output of the clusters C1-Cn, such as represented on the sparse temporal matrix 114, 114A, 114B, simplifies the representation of the data both spatially and temporally, for example, by representing intrinsic constraints on the dynamics of the data, making it easier to analyze and reduce false indications of faults.

In one aspect, one or more of the input time series generation module 105A, the matrix generation module 105B, the clustering module 105C, the sparse temporal matrix generation module 105D and the feature extraction and analysis module 105E may be distinct and identifiable units of a computer program executed by the processor 105, where each distinct and identifiable unit is configured to perform their respective functions as described herein. In another aspect, one or more of the input time series generation module 105A, the matrix generation module 105B, the clustering module 105C, the sparse temporal matrix generation module 105D and the feature extraction and analysis module 105E may be a distinct hardware module where each distinct hardware module has a respective processor (and memory) configured to perform their respective functions as described herein, e.g. through execution of any suitable program stored therein or accessible by the distinct hardware module.

Referring now to FIGS. 1 and 6 and exemplary operation of the vehicle system prognosis device 100 will be provided. For example, one or more predetermined characteristic 190P of a vehicle 802 are determined with one or more sensors 101 onboard the vehicle (FIG. 6, Block 600). A plurality of sensor signals, such as the multi-dimensional sensor signal data YD, corresponding to the predetermined characteristic 190P are obtained from the one or more sensors 101 by the processor 105 of the data recorder 103 (FIG. 6, Block 610). The plurality of sensor signals are received by the processor 105 from the one or more sensors 101 onboard the vehicle 802 (FIG. 6. Block 620) and the processor 105 determines an input time series of data Z(t) based on the sensor signals (FIG. 6, Block 630). The processor 105, onboard the vehicle, generates a matrix of time series data M(t) within a data distribution space based on the input time series of data Z(t) (FIG. 6, Block 640). The processor 105, onboard the vehicle, clusters the matrix of time series data M(t) based on predetermined clustering criteria into a predetermined number of data regions S of the data distribution space (FIG. 6, Block 650). In one aspect, as noted above, the data regions S may be subspaces S1-S4, non-linear manifolds S1B-S4B or localized regions or "blobs" S1A-S4A as illustrated in FIGS. 3A-3C. A sparse temporal matrix 114, 114A, 114B is generated with the processor 105 onboard the vehicle 802, based on data within the predetermined number of data regions (FIG. 6, Block 660). The processor 105, onboard the vehicle, extracts the extracted features 115 that are indicative of an operation of the vehicle system 190 and/or vehicle system component 190C from the sparse temporal matrix 114, 114A, 114B (FIG. 6, Block 670) and determines an operational status of the vehicle system 190 and/or vehicle system component 190C based on the extracted features 115 (FIG. 6, Block 680). The processor 105, onboard the vehicle, communicates the operational status of the vehicle system 190 and/or vehicle system component 190C to an operator or crew member of the vehicle 802 (FIG. 6, Block 690). In one aspect, the operational status of the vehicle system 190 and/or vehicle system component 190C may be presented to the operator or crew member in real time during deployment of the vehicle 802 or during vehicle maintenance. In other aspects the operational status of the vehicle system 190 and/or vehicle system component 190C may be presented to the operator or crew member at any suitable time such as during a recorded playback of the vehicle system prognosis device 100 output or offline analysis of the sensor 101 data after vehicle deployment.

Referring again to FIGS. 1 and 5, the aspects of the present disclosure have been applied in a case study to predict an impending fault in a nose gearbox of the aircraft 802 due to, for example, vibration. The aspects of the vehicle system prognosis device 100, for example, leverage field collected data (e.g., such as sensor 101 data) to detect early indications that are indicative of impending component faults. In this example, the field collected data was obtained from the data recorder 103 which included various accelerometer signals and low-level numeric features called condition indicators that are derived from the accelerometer measurements. The field collected data in this example was generated and recorded periodically by the vehicle 802 under predetermined operating regimes. The input time series of data Z(t) in this example, was the condition indicator time-series data that is specific to the nose gearbox of the aircraft 802. The indicator time-series data consisted of twenty-three condition indicator variables that were obtained by passing sensor 101 signal data through a number of functions. A time window having a size of three time slots was used and the data processing, as described above with respect to FIG. 2, resulted in the generation of a time series of sixty-nine dimensional vectors as input for the clustering method 200. For this case study, sparse subspace clustering was used as the clustering method 200, however other clustering methods could have been used as well, such as K-Means clustering, spectral clustering or agglomerative clustering.

Using the output of the vehicle system prognosis device 100 in this case study, early signs of impending nose gearbox fault was detected. The results of the case study are illustrated in FIG. 5. Between time 0 and about time 95, the data of the sparse temporal matrix 114B was resistant to fracturing into more than two temporally contiguous groups (e.g., clusters C1 and C2), noting that the shift from cluster C2 to T1 was due to a replacement of the main rotor head, trunnion and damper of the vehicle 802. Between about time 95 and about time 125, the data of the sparse temporal matrix 114B fractured into two groups corresponding to clusters C1 and C3 where one of the groups (e.g., cluster C1) is the same group observed during normal operating condition, but the other group (e.g., group C3) is a new group outside of the normal operating clusters. This fracturing is indicative of a pre-transition to a fault in the nose gearbox. Starting at about time 125 to time 160 the data of the sparse temporal matrix 114B moves entirely into the new group (e.g., cluster C3), which is indicative of an impending fault in the nose gearbox.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 700 as shown in FIG. 7 and an aircraft 802 as shown in FIG. 8. During pre-production, illustrative method 700 may include specification and design 704 of the aircraft 802 and material procurement 706. During production, component and subassembly manufacturing 708 and system integration 710 of the aircraft 802 take place. Thereafter, the aircraft 802 may go through certification and delivery 712 to be placed in service 714. While in service by a customer, the aircraft 802 is scheduled for routine maintenance and service 716 (which may also include modification, reconfiguration, refurbishment, and so on).

Each of the processes of the illustrative method 700 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, the aircraft 802 produced by the illustrative method 700 may include an airframe 818 with a plurality of high-level systems and an interior 822. Examples of high-level systems, which are distributed throughout the aircraft, include one or more of a propulsion system 824, an electrical power system 826, a hydraulic system 828, and an environmental system 830. Any number of other systems may be included. The vehicle system prognosis device 100 and methods described herein may be integrated into at least any one or more of the aforementioned vehicle systems 190, 824, 826, 828, 830 or any other systems of the aircraft 802. Although an aerospace example is shown, the principles of the invention may be applied to other industries, such as the automotive and maritime industries. Further, while the aircraft 802 is illustrated as a rotary wing aircraft in other aspects the aircraft may be a fixed wing aircraft or space vehicle.

The system and methods shown or described herein may be employed during any one or more of the stages of the manufacturing and service method 700. For example, components or subassemblies corresponding to component and subassembly manufacturing 708 may be fabricated or manufactured in a manner similar to components or subassemblies produced while the aircraft 802 is in service. Also, one or more aspects of the system, method, or combination thereof may be utilized during the production states 708 and 710, for example, by substantially expediting assembly of or reducing the cost of an aircraft 802. Similarly, one or more aspects of the system or method realizations, or a combination thereof may be utilized, for example and without limitation, while the aircraft 802 is in service, e.g., operation, maintenance and service 716.

Different examples and aspects of the system and methods are disclosed herein that include a variety of components, features, and functionality. It should be understood that the various examples and aspects of the system and methods disclosed herein may include any of the components, features, and functionality of any of the other examples and aspects of the system and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

The following are provided in accordance with the aspects of the present disclosure:

A1. A method for determining a vehicle system prognosis, the method comprising:

detecting a predetermined characteristic of a vehicle with one or more sensors onboard the vehicle;

obtaining a plurality of sensor signals corresponding to the predetermined characteristic from the one or more sensors;

receiving, with a processor onboard the vehicle, the plurality of sensor signals from the one or more sensors onboard the vehicle and determining, with the processor onboard the vehicle, an input time series of data based on the sensor signals;

generating, with the processor onboard the vehicle, a matrix of time series data based on the input time series of data;

clustering, with the processor onboard the vehicle, the matrix of time series data based on predetermined clustering criteria into a predetermined number of clusters;

generating a sparse temporal matrix, with the processor onboard the vehicle, based on the predetermined number of clusters;

extracting, with the processor onboard the vehicle, extracted features that are indicative of an operation of a vehicle system from the sparse temporal matrix and determining an operational status of the vehicle system based on the extracted features; and communicating, with the processor onboard the vehicle, the operational status of the vehicle system to an operator or crew member of the vehicle.

A2. The method of paragraph A1, wherein the matrix of time series data exists in a data distribution space having a dimension corresponding to a number of input time series and a size of a time window used to determine the matrix of time series data.

A3. The method of paragraph A2, wherein each time series in the matrix of time series data exists in a respective subspace within the data distribution space.

A4. The method of paragraph A2, wherein each time series in the matrix of time series data exists in a respective non-linear manifold within the data distribution space.

A5. The method of paragraph A2, wherein each time series in the matrix of time series data exists in a respective localized region within the data distribution space.

A6. The method of paragraph A2, wherein each cluster in the predetermined number of clusters comprises a hyperplane of the data distribution space.

A7. The method of paragraph A6, wherein extracting the extracted features that are indicative of the operation of the vehicle system comprises monitoring behavior of data points within the sparse temporal matrix with respect to an existence of the data points within one or more hyperplanes.

A8. The method of paragraph A6, wherein the extracted features that are indicative of the operation of the vehicle system include a fracturing behavior of the data points where the data points serially transition between two or more hyperplanes.

A9. The method of paragraph A8, wherein the fracturing behavior is indicative of a pre-transition to a fault in the vehicle system.

A10. The method of paragraph A6, wherein the extracted features that are indicative of the operation of the vehicle system include a transition behavior of the data points where the data points permanently transition from one hyperplane to a different hyperplane.

A11. The method of paragraph A10, wherein the transition behavior is indicative of a transition to a fault in the vehicle system.

A12. The method of paragraph A2, wherein clustering the matrix of time series data comprises clustering the matrix of time series data using sparse subspace clustering.

A13. The method of paragraph A2, wherein clustering the matrix of time series data comprises clustering the matrix of time series data using agglomerative clustering.

A14. The method of paragraph A2, wherein clustering the matrix of time series data comprises clustering the matrix of time series data using affinity propagation.

A15. The method of paragraph A1, wherein extracting the extracted features that are indicative of the operation of the vehicle system comprises monitoring a stability of data points within the predetermined number of clusters where a change in stability of the data points within the predetermined number of clusters is indicative of a transition to a fault in the vehicle system.

A16. The method of paragraph A1, wherein extracting the extracted features that are indicative of the operation of the vehicle system comprises monitoring behavior of data points within the sparse temporal matrix with respect to an existence of the data points within one or more of the a predetermined number of clusters.

A17. The method of paragraph A16, wherein the extracted features that are indicative of the operation of the vehicle system include a fracturing behavior of the data points where the data points serially transition between two or more clusters of the predetermined number of clusters.

A18. The method of paragraph A17, wherein the fracturing behavior is indicative of a pre-transition to a fault in the vehicle system.

A19. The method of paragraph A16, wherein the extracted features that are indicative of the operation of the vehicle system include a transition behavior of the data points where the data points permanently transition from one cluster to a different cluster.

A20. The method of paragraph A19, wherein the transition behavior is indicative of a transition to a fault in the vehicle system.

A21. The method of paragraph A1, wherein communicating the operational status of the vehicle system to the operator or crew member of the vehicle includes communicating a message to repair a component of the vehicle system.

A22. The method of paragraph A1, wherein communicating the operational status of the vehicle system to the operator or crew member of the vehicle includes communicating a message to replace a component of the vehicle system.

A23. The method of paragraph A1, wherein communicating the operational status of the vehicle system to the operator or crew member of the vehicle includes communicating a message to obtain a replacement component of the vehicle system and stage the replacement component at a predetermined area.

A24. The method of paragraph A1, wherein communicating the operational status of the vehicle system to the operator or crew member of the vehicle includes communicating a message to change a deployment schedule of the vehicle so that the vehicle system is repaired based on a remaining useful life prediction of a vehicle system component.

A25. The method of paragraph A1, wherein the extracted features that are indicative of an operation of a vehicle system include a stability of data points within the predetermined number of clusters, a fracturing of data points between two or more clusters of the predetermined number of clusters, and a transition of data points from one cluster to a different cluster of the predetermined number of clusters.

A26. The method of paragraph A1, wherein the predetermined number of clusters includes more than two temporally contiguous clusters.

A27. The method of paragraph A1, wherein the operational status of the vehicle system includes a remaining useful life of at least a component of the vehicle system.

A28. The method of paragraph A1, further comprising communicating, with the processor onboard the vehicle, one or more of the extracted features that are indicative of an operation of a vehicle system and the operational status of the vehicle system to a communication device located off-board the vehicle.

B1. A vehicle system prognosis device comprising:
one or more sensors onboard a vehicle, the one or more sensors being configured to detect a predetermined characteristic of the vehicle system and generate a plurality of sensor signals corresponding to the predetermined characteristic;
an indicator device; and
a processor onboard the vehicle, the processor being connected to the one or more sensors and the indicator device and being configured to
receive the plurality of sensor signals from the one or more sensors onboard the vehicle and determine an input time series of data based on the sensor signals;
generate a matrix of time series data based on the input time series of data;
cluster the matrix of time series data based on predetermined clustering criteria into a predetermined number of clusters;
generate a sparse temporal matrix based on the predetermined number of clusters;
extract extracted features that are indicative of an operation of a vehicle system from the sparse temporal matrix and determine an operational status of the vehicle system based on the extracted features; and
communicate the operational status of the vehicle system to an operator or crew member of the vehicle through the indicator device.

B2. The vehicle system prognosis device of paragraph B1, wherein the processor is configured to generate the matrix of time series data so that the matrix of time series data exists in a data distribution space having a dimension corresponding to a number of input time series and a size of a time window used to determine the matrix of time series data.

B3. The vehicle system prognosis device of paragraph B2, wherein each time series in the matrix of time series data exists in a respective subspace within the data distribution space.

B4. The vehicle system prognosis device of paragraph B2, wherein each time series in the matrix of time series data exists in a respective non-linear manifold within the data distribution space.

B5. The vehicle system prognosis device of paragraph B2, wherein each time series in the matrix of time series data exists in a respective localized region within the data distribution space.

B6. The vehicle system prognosis device of paragraph B2, wherein each cluster in the predetermined number of clusters comprises a hyperplane of the data distribution space.

B7. The vehicle system prognosis device of paragraph B6, wherein the processor is configured to extract the extracted features that are indicative of the operation of the vehicle system by monitoring behavior of data points within the sparse temporal matrix with respect to an existence of the data points within one or more hyperplanes.

B8. The vehicle system prognosis device of paragraph B6, wherein the extracted features that are indicative of the operation of the vehicle system include a fracturing behavior of the data points where the data points serially transition between two or more hyperplanes.

B9. The vehicle system prognosis device of paragraph B8, wherein the fracturing behavior is indicative of a pre-transition to a fault in the vehicle system.

B10. The vehicle system prognosis device of paragraph B6, wherein the extracted features that are indicative of the operation of the vehicle system include a transition behavior of the data points where the data points permanently transition from one hyperplane to a different hyperplane.

B11. The vehicle system prognosis device of paragraph B10, wherein the transition behavior is indicative of a transition to a fault in the vehicle system.

B12. The vehicle system prognosis device of paragraph B2, wherein clustering the matrix of time series data comprises clustering the matrix of time series data using sparse subspace clustering.

B13. The vehicle system prognosis device of paragraph B2, wherein clustering the matrix of time series data comprises clustering the matrix of time series data using agglomerative clustering.

B14. The vehicle system prognosis device of paragraph B2, wherein clustering the matrix of time series data comprises clustering the matrix of time series data using affinity propagation.

B15. The vehicle system prognosis device of paragraph B1, wherein the processor is configured to extract the extracted features that are indicative of the operation of the vehicle system by monitoring a stability of data points within the predetermined number of clusters where a change in stability of the data points within the predetermined number of clusters is indicative of a transition to a fault in the vehicle system.

B16. The vehicle system prognosis device of paragraph B1, wherein the processor is configured to extract the extracted features that are indicative of the operation of the vehicle system by monitoring behavior of data points within the sparse temporal matrix with respect to an existence of the data points within one or more of the a predetermined number of clusters.

B17. The vehicle system prognosis device of paragraph B16, wherein the extracted features that are indicative of the operation of the vehicle system include a fracturing behavior of the data points where the data points serially transition between two or more clusters of the predetermined number of clusters.

B18. The vehicle system prognosis device of paragraph B17, wherein the fracturing behavior is indicative of a pre-transition to a fault in the vehicle system.

B19. The vehicle system prognosis device of paragraph B16, wherein the extracted features that are indicative of the operation of the vehicle system include a transition behavior of the data points where the data points permanently transition from one cluster to a different cluster.

B20. The vehicle system prognosis device of paragraph B19, wherein the transition behavior is indicative of a transition to a fault in the vehicle system.

B21. The vehicle system prognosis device of paragraph B1, wherein the processor is configured to cause a message to repair a component of the vehicle system to be presented through the indictor device.

B22. The vehicle system prognosis device of paragraph B1, wherein the processor is configured to cause a message to replace a component of the vehicle system to be presented through the indicator device.

B23. The vehicle system prognosis device of paragraph B1, wherein processor is configured to cause a message to obtain a replacement component of the vehicle system and stage the replacement component at a predetermined area to be presented through the indicator device.

B24. The vehicle system prognosis device of paragraph B1, wherein the processor is configured to cause a message to change a deployment schedule of the vehicle so that the vehicle system is repaired based on a remaining useful life prediction of a vehicle system component to be presented through the indicator device.

B25. The vehicle system prognosis device of paragraph B1, wherein the extracted features that are indicative of an operation of a vehicle system include a stability of data points within the predetermined number of clusters, a fracturing of data points between two or more clusters of the predetermined number of clusters, and a transition of data points from one cluster to a different cluster of the predetermined number of clusters.

B26. The vehicle system prognosis device of paragraph B1, wherein the predetermined number of clusters includes more than two temporally contiguous clusters.

B27. The vehicle system prognosis device of paragraph B1, wherein the operational status of the vehicle system includes a remaining useful life of at least a component of the vehicle system.

B28. The vehicle system prognosis device of paragraph B1, wherein the indicator device is one or more of an aural indicator and a visual indicator.

C1. A method for determining a vehicle system prognosis, the method comprising:

detecting a predetermined characteristic of a vehicle with one or more sensors onboard the vehicle;

obtaining a plurality of sensor signals corresponding to the predetermined characteristic from the one or more sensors;

receiving, with a processor onboard the vehicle, the plurality of sensor signals from the one or more sensors onboard the vehicle and determining, with the processor onboard the vehicle, an input time series of data based on the sensor signals;

generating, with the processor onboard the vehicle, a matrix of time series data within a data distribution space based on the input time series of data;

clustering, with the processor onboard the vehicle, the matrix of time series data based on predetermined clustering criteria into a predetermined number of data regions of the data distribution space;

generating a sparse temporal matrix, with the processor onboard the vehicle, based on data within the predetermined number of data regions;

extracting, with the processor onboard the vehicle, extracted features that are indicative of an operation of a vehicle system from the sparse temporal matrix and determining an operational status of the vehicle system based on the extracted features; and communicating, with the processor onboard the vehicle, the operational status of the vehicle system to an operator or crew member of the vehicle.

C2. The method of paragraph C1, wherein the data distribution space has a dimension corresponding to a number of input time series and a size of a time window used to determine the matrix of time series data.

C3. The method of paragraph C1, wherein the predetermined number of data regions of the data distribution space comprises a predetermined number of subspaces within the data distribution space.

C4. The method of paragraph C3, wherein extracting the extracted features that are indicative of the operation of the vehicle system comprises monitoring behavior of data points within the sparse temporal matrix with respect to an existence of the data points within one or more hyperplanes.

C5. The method of paragraph C1, wherein the predetermined number of data regions of the data distribution space comprises a predetermined number of non-linear manifolds within the data distribution space.

C6. The method of paragraph C1, wherein the predetermined number of data regions of the data distribution space comprise a predetermined number of localized regions within the data distribution space.

C7. The method of paragraph C1, wherein the extracted features that are indicative of the operation of the vehicle system include a fracturing behavior of the data points where the data points serially transition between two or more of the predetermined number of data regions.

C8. The method of paragraph C5, wherein the fracturing behavior is indicative of a pre-transition to a fault in the vehicle system.

C9. The method of paragraph C1, wherein the extracted features that are indicative of the operation of the vehicle system include a transition behavior of the data points where the data points permanently transition from one of the predetermined number of data regions to a different one of the predetermined number of data regions.

C10. The method of paragraph C9, wherein the transition behavior is indicative of a transition to a fault in the vehicle system.

C11. The method of paragraph C1, wherein clustering the matrix of time series data comprises clustering the matrix of time series data using sparse subspace clustering.

C12. The method of paragraph C1, wherein clustering the matrix of time series data comprises clustering the matrix of time series data using agglomerative clustering.

C13. The method of paragraph C1, wherein clustering the matrix of time series data comprises clustering the matrix of time series data using affinity propagation.

C14. The method of paragraph C1, wherein extracting the extracted features that are indicative of the operation of the vehicle system comprises monitoring a stability of data points within the predetermined number of data regions where a change in stability of the data points within the predetermined number of data regions is indicative of a transition to a fault in the vehicle system.

C15. The method of paragraph C1, wherein communicating the operational status of the vehicle system to the operator or crew member of the vehicle includes communicating a message to repair a component of the vehicle system.

C16. The method of paragraph C1, wherein communicating the operational status of the vehicle system to the operator or crew member of the vehicle includes communicating a message to replace a component of the vehicle system.

C17. The method of paragraph C1, wherein communicating the operational status of the vehicle system to the operator or crew member of the vehicle includes communicating a message to obtain a replacement component of the vehicle system and stage the replacement component at a predetermined area.

C18. The method of paragraph C1, wherein communicating the operational status of the vehicle system to the operator or crew member of the vehicle includes communicating a message to change a deployment schedule of the vehicle so that the vehicle system is repaired based on a remaining useful life prediction of a vehicle system component.

C19. The method of paragraph C1, wherein the extracted features that are indicative of an operation of a vehicle system include a stability of data points within the predetermined number of data regions, a fracturing of data points between two or more data regions of the predetermined number of data regions, and a transition of data points from one data region to a different data region of the predetermined number of data regions.

C20. The method of paragraph C1, wherein the predetermined number of data regions includes more than two temporally contiguous data regions.

C21. The method of paragraph C1, wherein the operational status of the vehicle system includes a remaining useful life of at least a component of the vehicle system.

C22. The method of paragraph C1, further comprising communicating, with the processor onboard the vehicle, one or more of the extracted features that are indicative of an operation of a vehicle system and the operational status of the vehicle system to a communication device located off-board the vehicle.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A method for determining a vehicle system prognosis, the method comprising:
    detecting a predetermined characteristic of a vehicle with one or more sensors onboard the vehicle;
    obtaining a plurality of sensor signals corresponding to the predetermined characteristic from the one or more sensors;
    receiving, with a processor onboard the vehicle, the plurality of sensor signals from the one or more sensors onboard the vehicle and determining, with the processor onboard the vehicle, an input time series of data based on the sensor signals;
    generating, with the processor onboard the vehicle, a matrix of time series data based on the input time series of data;
    clustering, with the processor onboard the vehicle, the matrix of time series data based on predetermined clustering criteria into a predetermined number of clusters;
    generating a sparse temporal matrix, with the processor onboard the vehicle, based on the predetermined number of clusters, where each cluster comprises a hyperplane within the sparse temporal matrix;
    extracting, with the processor onboard the vehicle, extracted features that are indicative of an operation of a vehicle system from the sparse temporal matrix based on data point behavior with respect to two or more hyperplanes within the sparse temporal matrix and determining an operational status of the vehicle system based on the extracted features; and
    communicating, with the processor onboard the vehicle, the operational status of the vehicle system to an operator or crew member of the vehicle.

2. The method of claim 1, wherein the matrix of time series data exists in a data distribution space having a dimension corresponding to a number of input time series and a size of a time window used to determine the matrix of time series data.

3. The method of claim 1, wherein extracting the extracted features that are indicative of the operation of the vehicle system comprises monitoring a stability of data points within the predetermined number of clusters where a change in stability of the data points within the predetermined number of clusters is indicative of a transition to a fault in the vehicle system.

4. The method of claim 1, wherein extracting the extracted features that are indicative of the operation of the vehicle system comprises monitoring behavior of data points within the sparse temporal matrix with respect to an existence of the data points within one or more of the a predetermined number of clusters.

5. The method of claim 4, wherein the extracted features that are indicative of the operation of the vehicle system include a fracturing behavior of the data points where the data points serially transition between two or more clusters of the predetermined number of clusters.

6. The method of claim 5, wherein the fracturing behavior is indicative of a pre-transition to a fault in the vehicle system.

7. The method of claim 4, wherein the extracted features that are indicative of the operation of the vehicle system include a transition behavior of the data points where the data points permanently transition from one cluster to a different cluster.

8. The method of claim 7, wherein the transition behavior is indicative of a transition to a fault in the vehicle system.

9. The method of claim 1, wherein the predetermined number of clusters includes more than two temporally contiguous clusters.

10. A vehicle system prognosis device comprising:
one or more sensors onboard a vehicle, the one or more sensors being configured to detect a predetermined characteristic of the vehicle system and generate a plurality of sensor signals corresponding to the predetermined characteristic;
an indicator device; and
a processor onboard the vehicle, the processor being connected to the one or more sensors and the indicator device and being configured to
receive the plurality of sensor signals from the one or more sensors onboard the vehicle and determine an input time series of data based on the sensor signals;
generate a matrix of time series data based on the input time series of data;
cluster the matrix of time series data based on predetermined clustering criteria into a predetermined number of clusters;
generate a sparse temporal matrix based on the predetermined number of clusters, where each cluster comprises a hyperplane within the sparse temporal matrix;
extract extracted features that are indicative of an operation of a vehicle system from the sparse temporal matrix based on data point behavior with respect to two or more hyperplanes within the sparse temporal matrix and determine an operational status of the vehicle system based on the extracted features; and
communicate the operational status of the vehicle system to an operator or crew member of the vehicle through the indicator device.

11. The vehicle system prognosis device of claim 10, wherein the processor is configured to generate the matrix of time series data so that the matrix of time series data exists in a data distribution space having a dimension corresponding to a number of input time series and a size of a time window used to determine the matrix of time series data.

12. The vehicle system prognosis device of claim 10, wherein the processor is configured to extract the extracted features that are indicative of the operation of the vehicle system by monitoring a stability of data points within the predetermined number of clusters where a change in stability of the data points within the predetermined number of clusters is indicative of a transition to a fault in the vehicle system.

13. The vehicle system prognosis device of claim 10, wherein the processor is configured to extract the extracted features that are indicative of the operation of the vehicle system by monitoring behavior of data points within the sparse temporal matrix with respect to an existence of the data points within one or more of the a predetermined number of clusters.

14. The vehicle system prognosis device of claim 13, wherein the extracted features that are indicative of the operation of the vehicle system include a fracturing behavior of the data points where the data points serially transition between two or more clusters of the predetermined number of clusters.

15. The vehicle system prognosis device of claim 13, wherein the extracted features that are indicative of the operation of the vehicle system include a transition behavior of the data points where the data points permanently transition from one cluster to a different cluster.

16. A method for determining a vehicle system prognosis, the method comprising:
detecting a predetermined characteristic of a vehicle with one or more sensors onboard the vehicle;
obtaining a plurality of sensor signals corresponding to the predetermined characteristic from the one or more sensors;
receiving, with a processor onboard the vehicle, the plurality of sensor signals from the one or more sensors onboard the vehicle and determining, with the processor onboard the vehicle, an input time series of data based on the sensor signals;
generating, with the processor onboard the vehicle, a matrix of time series data within a data distribution space based on the input time series of data;
clustering, with the processor onboard the vehicle, the matrix of time series data based on predetermined clustering criteria into a predetermined number of data regions of the data distribution space;
generating a sparse temporal matrix, with the processor onboard the vehicle, based on data within the predetermined number of data regions, where each data region comprises a hyperplane within the sparse temporal matrix;
extracting, with the processor onboard the vehicle, extracted features that are indicative of an operation of a vehicle system from the sparse temporal matrix based on data point behavior with respect to at least two hyperplanes within the sparse temporal matrix and determining an operational status of the vehicle system based on the extracted features; and
communicating, with the processor onboard the vehicle, the operational status of the vehicle system to an operator or crew member of the vehicle.

17. The method of claim 16, wherein the predetermined number of data regions of the data distribution space comprises a predetermined number of subspaces within the data distribution space.

18. The method of claim 16, wherein extracting the extracted features that are indicative of the operation of the vehicle system comprises monitoring behavior of the data points within the sparse temporal matrix with respect to an existence of the data points within one or more of the at least two hyperplanes.

19. The method of claim 16, wherein the predetermined number of data regions of the data distribution space comprises a predetermined number of non-linear manifolds within the data distribution space.

20. The method of claim 16, wherein the predetermined number of data regions of the data distribution space comprise a predetermined number of localized regions within the data distribution space.

* * * * *